United States Patent [19]
Yemini et al.

[11] Patent Number: 5,418,779
[45] Date of Patent: May 23, 1995

[54] HIGH-SPEED SWITCHED NETWORK ARCHITECTURE

[75] Inventors: Yechiam Yemini, W. Briarclife Manor; Danilo Florissi, New York, both of N.Y.

[73] Assignee: The Trustee of Columbia University of New York, New York, N.Y.

[21] Appl. No.: 213,710

[22] Filed: Mar. 16, 1994

[51] Int. Cl.$^6$ .................... H04L 12/48; H04G 1/04
[52] U.S. Cl. ........................ 370/54; 370/60; 370/94.3; 370/58.1
[58] Field of Search ............ 370/54, 58.1, 58.2, 370/58.3, 60, 60.1, 94.1, 94.2, 94.3; 340/825.02, 825.03, 826, 827

[56] References Cited

U.S. PATENT DOCUMENTS

| | | | |
|---|---|---|---|
| 4,466,060 | 8/1984 | Riddle | 370/54 |
| 4,805,166 | 2/1989 | Ardon et al. | 370/54 |
| 4,873,517 | 10/1989 | Ba atz et al. | 370/54 |
| 4,991,204 | 2/1991 | Yamamoto et al. | 370/54 |
| 5,224,100 | 6/1993 | Lee et al. | 370/94.3 |
| 5,245,609 | 9/1993 | Ofek et al. | 370/94.3 |

OTHER PUBLICATIONS

"The Asynchronous Transfer Mode: a tutorial" by Jean-Yves Le Boudec; Computer Networks and ISDN 24 (1992) 279–309 North Holland.

"An Overview of Lightwave Packet Networks", by Acampora et al.; Jan. 1989 IEEE Network; pp. 29–41.

"Dense Wavelength Division Multiplexing Networks: Principles and Applications" by C. A. Brackett; IEEE Journal on Selected Areas in Communications, vol. 8, No. 6, Aug. 1990; pp. 948–964.

"Highball: a High Speed, Reserved-Access, Wide Area Network" by Mills et al; Electrical Engineering Department Technical Report 90-9-1; University of Delaware Sep. 1990; pp. 1–31 with Abstract;

"Enhanced Packet Switching Architecture for Advanced ISDN Services" by Y. Ikeda et al.; pp. 0266–0272, 1987.

"Network Routing Evolution" by Ash et al.; Network Management and Control, Edited by A. Kershenbaum et al., Plenum Press, New York, 1990; pp. 357–367.

"The Building Block for the Intelligent Network" by V. K. Batra; Telephony/Nov. 20, 1989; pp. 57, 60, 62 and 64.

"Network Node NK2000–A Controllable Multiplexing and Distribution Facility for Transmission Networks" by E. M. Kügler; British Telecommunications Engineering, vol. 9, Aug. 1990; pp. 60–63.

"ACCUNET TM Switched 56 is Providing Switched Digital Transmission Now" by Moe et al.; Record-/AT&T Bell Laboratories, Sep. 1985, pp. 26–30.

*Primary Examiner*—Wellington Chin
*Attorney, Agent, or Firm*—Brumbaugh & Graves, Donohue & Raymond

[57] ABSTRACT

In a switched network wherein a multiplicity of switching nodes are interconnected with communications links, communications traffic within the network is switched according to different routing trees each associated with a switching node as the destination node. The routing tree specifies a subset of incoming links from which each node receives the traffic and an outgoing link to which the node transfers the received traffic. Each switching node allocates time bands for implementing the different routing trees one at a time. However, nonoverlapping routing trees which share no common link can be implemented at the same time to increase the traffic throughput.

49 Claims, 9 Drawing Sheets

HIGH-SPEED SWITCHED NETWORK ARCHITECTURE

TECHNICAL FIELD

This invention relates to communications network architectures and particularly to an architecture facilitating control of data traffic in switched networks.

BACKGROUND OF THE INVENTION

In recent years, advances in technologies have dramatically increased transmission rates and bandwidth in communications networks. Such networks have evolved into what are today known as high-speed networks (HSN's) and are capable of transmitting data at rates on the order of gigabits or even terabits per second. Numerous applications are emerging and attempt to capitalize on an HSN's provision of the enormous bandwidth. Examples of such applications include live video multicasting, multimedia conferencing, high-quality image retrieval, and virtual reality environments.

Because of the extremely high transmission rate requirement, complex network processing by taking advantage of the previous gap between the relatively fast processor speed and relatively slow transmission rate is no longer a reality to HSN's. As a result, a high speed switched network must boost significantly the processing speed of switching nodes to rapidly route the transmitted data therethrough.

A conventional packet switched network is limited in delivering the high processing speed as required. The network nodes in such a packet switched network need to analyze the frame header ofTeach packet in transit to obtain address information in performing routing. The time required for the frame processing is undesirably long.

On the other hand, a conventional circuit switched network does not require the network nodes to perform frame processing. It however requires dedicated circuits for communications between node pairs. This is undesirable in that it neither provides effective bandwidth utilization nor supports efficient interconnection.

Asynchronous transfer mode (ATM) networks are being developed based on the combined concepts of packet switching and virtual-circuit switching. The architecture of one such network is described in: J. Boudec, "Asynchronous Transfer Mode: a tutorial," *Computer Networks and ISDN Systems*, vol. 24, no. 4, May 1992. ATM network nodes switch cells of information which are identified by the virtual circuit to which they pertain. Before forwarding the ATM cells, a virtual circuit must be established. Thus, among other problems, ATM networks undesirably inherit all the delays associated with circuit establishment, and additional delays resulting from switching the ATM cells to map the virtual circuit identifiers to the appropriate switch input or output ports. In addition, an ATM network undesirably requires that the data entering the network be adapted to an ATM frame structure. As a result, the data needs to be inconveniently converted back into its original protocol before it leaves the network.

Another type of switched networks is known as a wave division multiplexing (WDM) network. The architecture of one such network is described in: A. Acampora et al., "An Overview of Lightwave Packet Network," *IEEE Network Magazine*, pp. 29–41, Jan. 1989; and C. Brakett, "Dense Wavelength Division Multiplexing network: Principles and Applications," *IEEE Journal of Selected Areas in Communications*, vol. 8, no. 6, pp. 948–64, Aug. 1990. A WDM network provides dedicated access to destinations via appropriate allocation of wavelengths. Routing is accomplished by configuring nodes to switch the wavelengths to provide source-destination connectivity. Contention among simultaneous transmissions to the same destination are resolved at switching nodes. Desirably, WDM networks may be configured to support circuit-like services and multicasting. However, the implementation of a WDM network is limited to an optical medium and relies significantly upon specialized characteristics of optical transmission. Moreover, in order to realize the high processing speeds at the switching nodes, the network requires optical tuning of switches in the nodes at incoming traffic rates. The optical tuning, as required, is nevertheless beyond the current state of the art. As a result, present WDM networks use dedicated wavelengths between node pairs, and packets may only be sent directly to a neighboring node. At the node, packets need to be processed to determine the destination route, thus undesirably increasing the processing time.

Still another type of switched networks is known as a Highball network. The architecture of one such network is described in: D. Mills et al., "Highball: A High Speed, Reserved-Access, Wide Area Network," *Technical Report*, 90-9-1, Electronic Engineering Department, University of Delaware, September 1990. In accordance with the Highball network architecture, switching nodes schedule traffic bursts by configuring the switches to support uninterrupted communications. To this end, nodes broadcast requests to all other nodes, specifying their data transmission needs to all possible destinations. This information is then used to determine a schedule at each node and establish time intervals during which output links are dedicated to specific input links. As such, the schedules determined by different nodes must be consistent and the nodes must maintain extremely accurate synchronization. The Highball networks are designed to serve traffic that can tolerate latency delays due to initial scheduling. Thus, the scheduling complexity and the critically accurate synchronization requirement are major shortcomings inherent in the Highball network architecture.

Other prior art networks whose operations rely on substantial traffic multiplexing suffer similar shortcomings. Issues pertaining to these networks such as buffer sizing at intermediate nodes, bandwidth allocation, capacity assignment, and design are resolved based on the assumptions that operations are in equilibrium and traffic demands are originated from a combination of many independent and uncorrelated sources. However, in an HSN a small number of correlated sources may generate correlated traffic comparable to many other sources multiplexed, thus substantially undermining the above assumptions.

In addition, propagation delays in the prior art networks which used to be negligible compared with transmission delays become significant in HSN's. For example, with a cross-country propagation delay of about 30 ms, one can transmit 9 Mbytes through an HSN at 2.4 Gbits/sec. during such a delay. Because of the long propagation delay relative to the transmission delay, conventional protocols based on global feedback for flow control or recovery from loss are no longer effective in HSN's.

SUMMARY OF THE INVENTION

The present invention overcomes the prior art limitations by employing routing trees in a switched network including a multiplicity of switching nodes. Each switching node is connected to one or more incoming links from which data is received and to one or more outgoing links to which the data is transferred. Each routing tree is associated with a different switching node and specifies the routing of data through the switching nodes in the network. Time bands are defined for implementing the routing trees, and each time band is associated with one or more of the routing trees. A switching node switches the data from a subset of its incoming links to a subset of its outgoing links in accordance with the one or more of the routing trees during the time bands associated therewith.

Advantageously, the invention achieves a first object to eliminate complex frame processing by the switching nodes to increase the processing speed, a second object to support simultaneously multiple protocols which are transparent to the network, a third object to provide a network mechanism which can flexibly support various qualities of service needs, and a fourth object to reduce the network complexity and equipment cost without compromising performance and services.

BRIEF DESCRIPTION OF THE DRAWING

Further objects, features and advantages of the invention will become apparent from the following detailed description taken in conjunction with the accompanying drawing showing a preferred embodiment of the invention, in which.

Throughout the figures of the drawing, the same reference numerals and characters are used to denote like features, elements, components or portions of the illustrated network.

DETAILED DESCRIPTION

Figure 1:
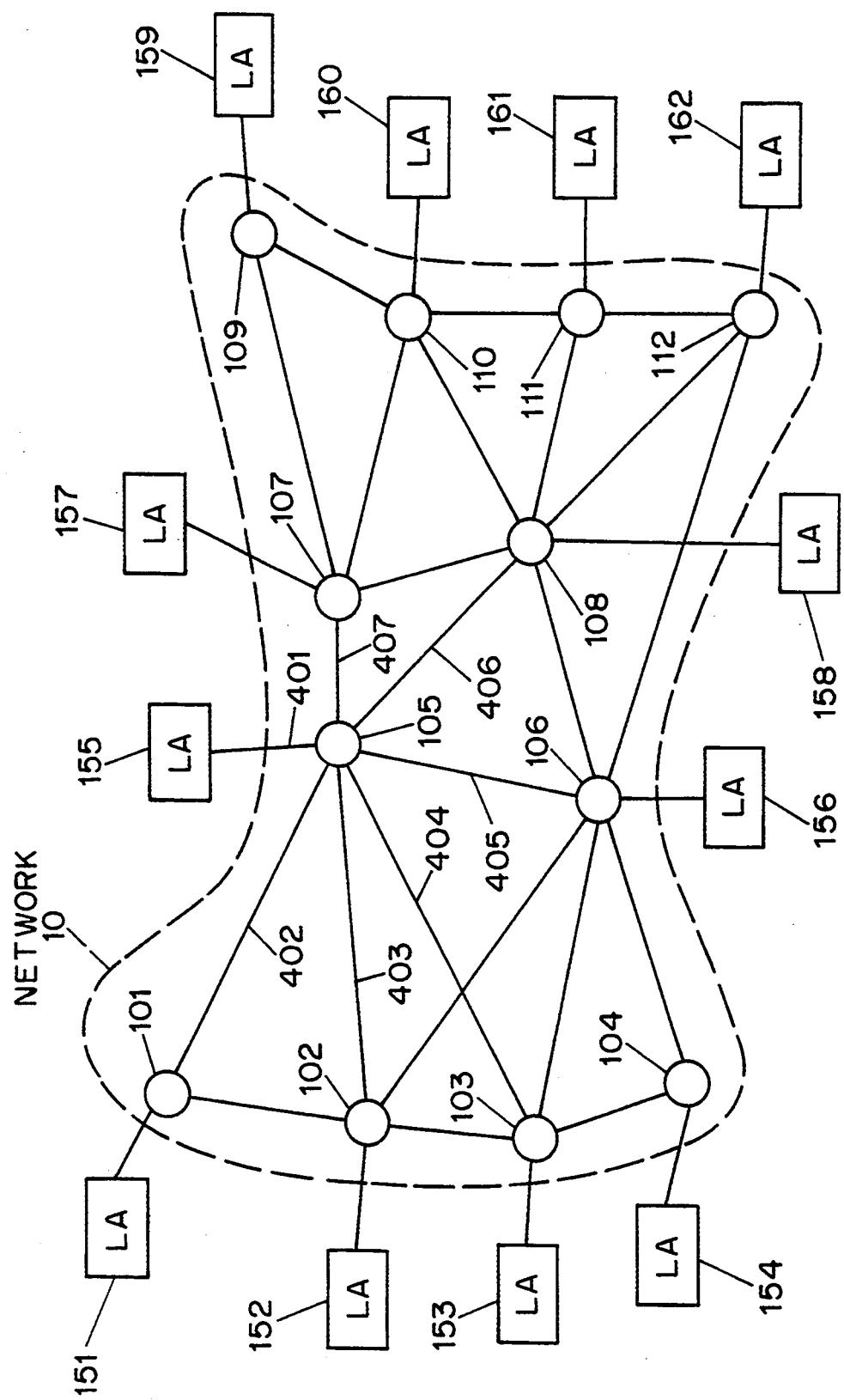
FIG. 1 illustrates a switched network connected to a multiplicity of local accesses in accordance with the invention.

FIG. 1 illustrates an exemplary switched network 10 connecting a plurality of local accesses (LA's). The switched network 10 is designed pursuant to an "Isochronets" architecture in accordance with the invention. The Isochronets applies an inventive route division multiple access (RDMA) switching technique that divides network bandwidth among routing trees each associated with a destination node. Using this technique, the Isochronets avoids content-dependent processing at intermediate switching nodes, and thereby allows a large range of transmission speeds and supports all-optical implementations.

It will become apparent from the discussion below that in accordance with the RDMA scheme, routing of data traffic through the network 10 involves allocation of time bands each assigned to a routing tree. Data frames from the LA's access the respective trees during their associated time bands. During each time band, data frames from an LA propagates to a destination node through the routing tree associated therewith. If no other traffic contends for intermediate tree nodes, the frames will traverse the network uninterrupted. This being so, the entire network may be viewed as a routing medium shared by the routing trees both in time and space. In other words, the inventive RDMA scheme is characterized in that bandwidth is time- and space-divided among the routing trees.

In FIG. 1, the network 10 implementing the Isochronets architecture illustratively comprises twelve switching nodes, namely, nodes 101 through 112. These twelve nodes are connected to one another with bidirectional communications lines, and are also connected via other bidirectional communications lines to twelve LA's 151 through 162. By way of example, but not limitation, each communications line here transports a bit stream at a rate on the order of gigabits per second. Each LA includes a communications device capable of transmitting and receiving data. Such a communications device may be, for example, a local area network, a host computer, a terminal, a personal computer, etc.

Figure 2:
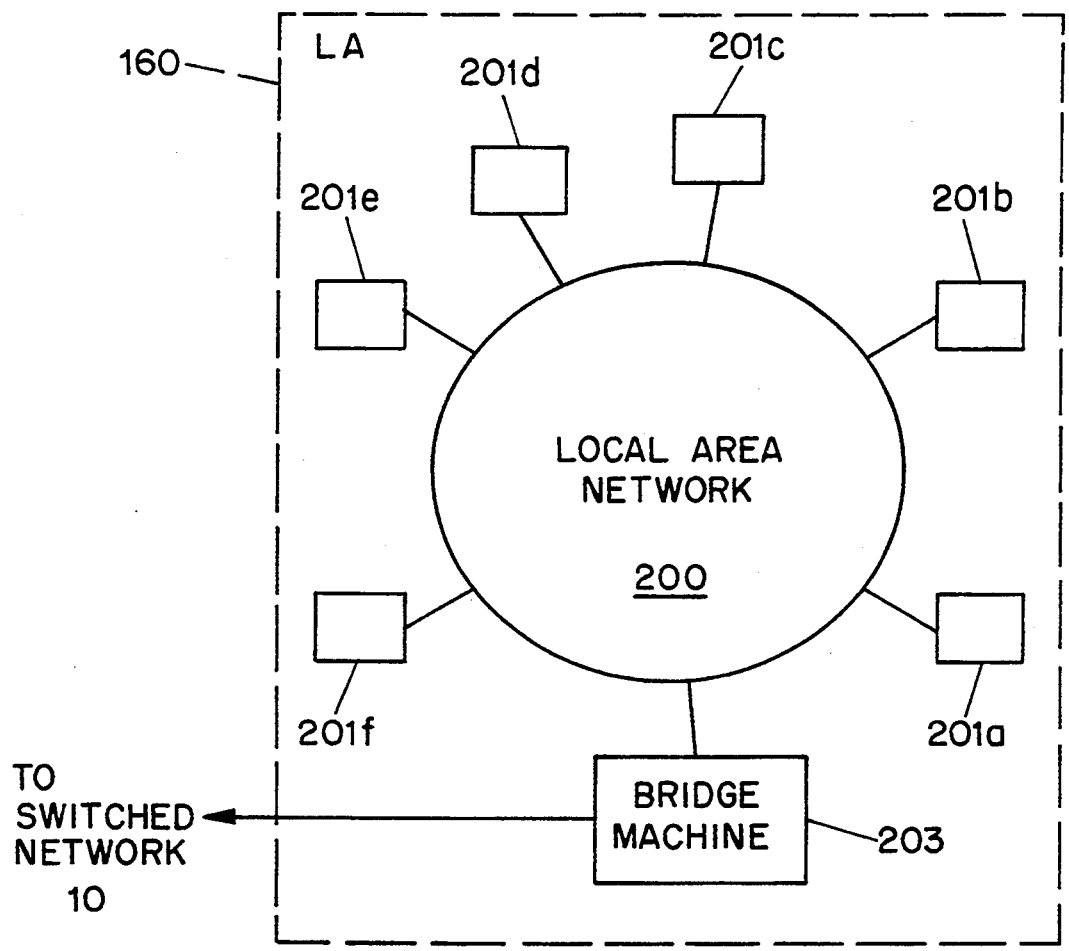
FIG. 2 illustrates one such local access of FIG. 1.

FIG. 2 illustrates an LA, say, LA 160, wherein a conventional local area network 200 connects personal computers 201a through 201f thereon. The local area network 200 accesses the switched network 10 through a bridge machine 203. The latter may be a host computer conveying data packets from the personal computers 201a–201f to the switching node 110 within the network 10. Other functions of the bridge machine 203 are described hereinbelow.

Figure 3:
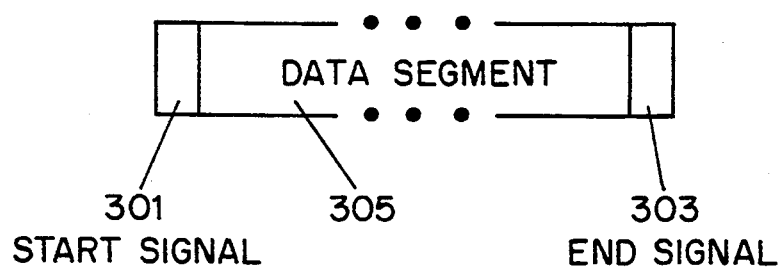
FIG. 3 illustrates the format of a data frame communicated in the switched network of FIG. 1.

Communications devices of an LA communicate through the network 10 with devices of other LA's using appropriate protocols. Such protocols are transparent to the network 10. That is, the network 10 routes data from a device to another through various switching nodes in the network, irrespective of the protocols in which the devices communicate. However, data transported in the communications lines in the network 10 is required to comply with a low level protocol upon which the switching nodes agree. This is necessary because a switching node when receiving needs to recognize the beginnings and ends of data segments from different sources. To this end, the data segments transported in the network 10 are enclosed in frames. FIG. 3 illustrates the structure of a generic frame wherein a start signal marks the beginning of the frame and is numerically denoted 301. This start signal is followed by a data segment 305 which is variable in bit-length. This data segment contains properly formatted data for communications between a transmitting device associated with a source node and the intended, receiving device associated with a destination node. Following the data segment 305 is an end signal which marks the end of the frame, and which is numerically denoted 303. One of the functions of the aforementioned bridge machine is to generate and attach the requisite start and end signals to data segments transmitted from the associated LA.

Figure 4:
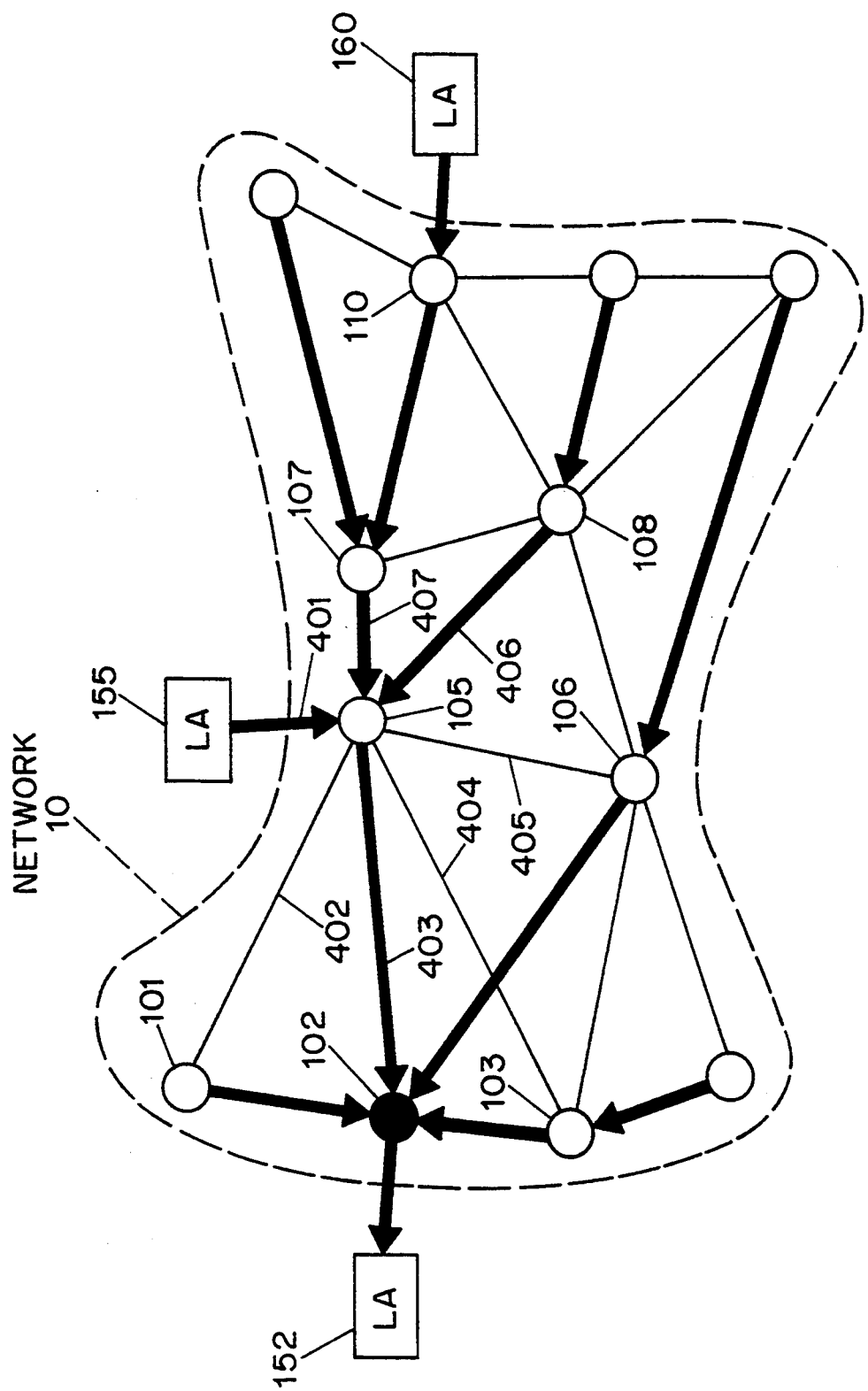
FIG. 4 illustrates a routing tree specifying the routing of data frames through the switched network of FIG. 1.

The routing of data in the network 10 is in accordance with routing trees leading from source nodes to destination nodes. In accordance with the invention, each destination node is associated with a different routing tree. Since each of the twelve nodes in the network 10 can possibly become a destination node at one time or another, there are thus twelve routing trees associated therewith. FIG. 4 illustrates one such routing tree which is associated with node 102 as the destination node. As shown in FIG. 4, the routing tree is defined by arrows and is rooted at the destination node 102, which is blackened. Data traffic from all other nodes directed to the destination node 102 is routed through the network as indicated by the arrows. For example, data transmitted from communication devices of LA 160 to communication devices of LA 152, which is connected to the node 102 as the destination node, is routed through the nodes 110, 107, 105 and 102 in that order.

It should be noted at this point that the routing tree of FIG. 4 associated with the node 102 is for illustrative purposes. Depending on factors such as particular traffic patterns and geographic locations of the nodes in the network, those skilled in the art can readily devise other routing trees which may be more suitable to their particular applications. For the same reasons, the description of the routing tree associated with every other node than node 102 is omitted here.

Figure 5:
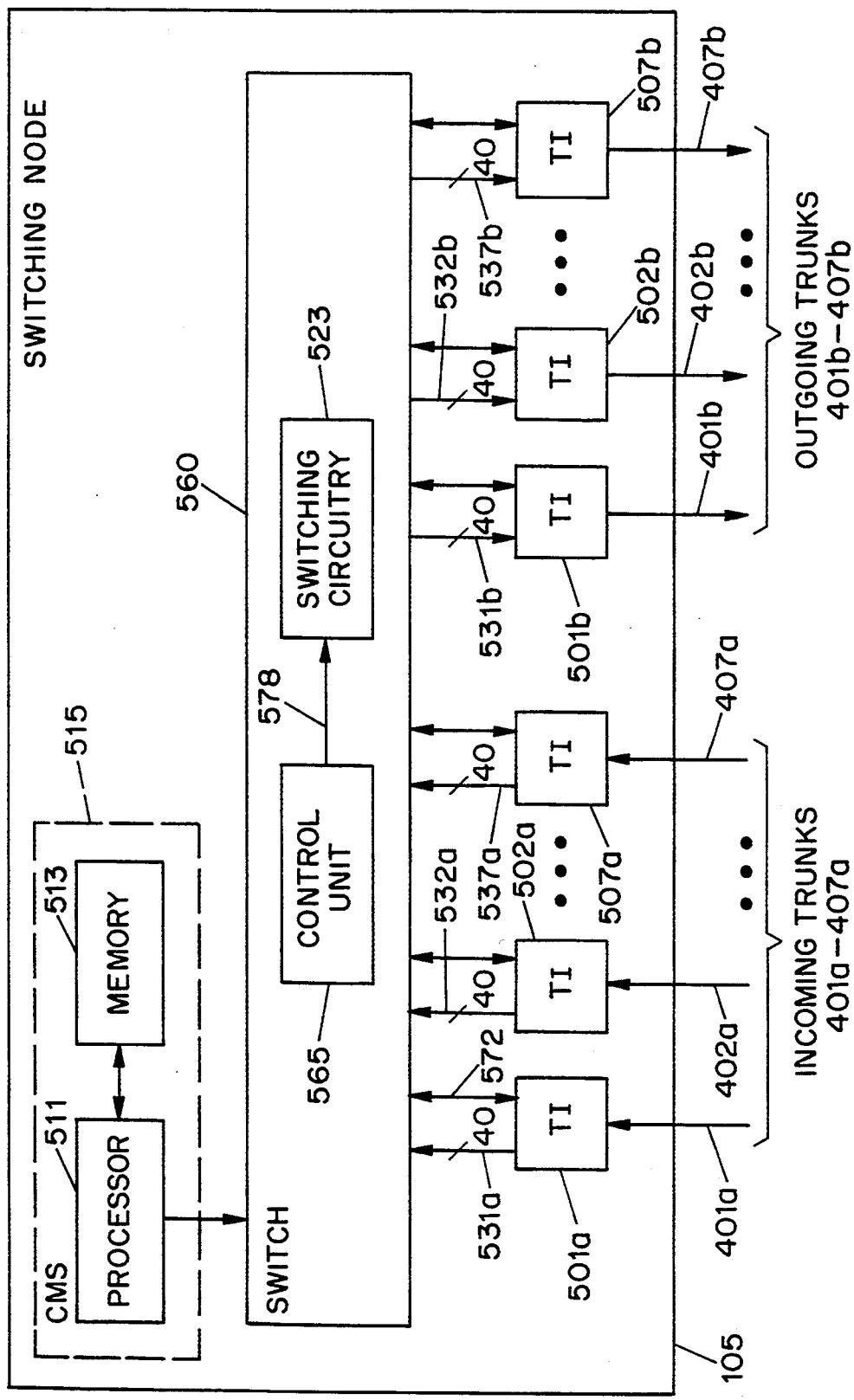
FIG. 5 is a block diagram of a switching node in the switched network of FIG. 1.

The switching nodes in the network 10 are similar in structure. FIG. 5 is a block diagram of one such node which is, illustratively, the node 105. The latter, as shown in FIG. 1, is connected to LA 155, and the nodes 101, 102, 103, 106, 107 and 108 via seven communication lines 401 through 407, respectively. Since each of such lines is a bidirectional line, it comprises an incoming trunk and an outgoing trunk. Specifically, the line 401 consists of an incoming trunk 401a and an outgoing trunk 401b; the line 402 consists of an incoming trunk 402a and an outgoing trunk 402b; and so on and so forth. The node 105 in FIG. 5 comprises seven incoming trunk interfaces (TI's) 501a through 507a on which the respective incoming trunks 401a through 407a are terminated, and seven outgoing TI's 501b through 507b from which the respective outgoing trunks 401b through 407b emanate. It should be pointed out that each TI in this illustrative embodiment can be realized by using a commercial chip set, such as a TAXI chip set or a Supernet chip set. Details on the specifications of the TAXI and Supernet chip sets may be respectively found in: "Am7968/Am7969-125 TAXIchip(TM) Integrated Circuits (Transparent Asynchronous Xmitter-Receiver Interface", Rev. D, April 1991; and "The SUPERNET(TM) Family for FDDI 1989 Data Book" Rev C February 1989; both of which are available at Advanced Micro Devices, Inc., 901 Thompson Place, P.O. Box 3453, Sunnyvale, California 94088-3453.

The node 105 also comprises a switch 560 including a control unit 565 and switching circuitry 523; and a control and management section (CMS) 515 including a processor 511 and a memory 513. CMS 515 is programmed with information of routing tree configurations involving the node 105, and schedules for each tree configuration. CMS 515 can be reprogrammed from time to time to change the routing tree configurations and/or their schedules to respond to the particular traffic demand of the network 10. The routing tree and the schedule information is provided to the control unit 565 within the switch 560. With this information, the control unit 565 configures the switching circuitry 523 to switch data traffic from the incoming TI's 501a–507a to selected ones of outgoing TI's 501b–507b. Specifically, the incoming TI's 501a–507a are connected to the switching circuitry 523 through 40-bit multileads 531a–537a, respectively. In addition, the outgoing TI's 501b–507b are connected to the circuitry 523 through 40-bit multileads 531b–537b, respectively. The unit 565 and circuitry 523 are connected via a control data multilead 578 and are further described hereinbelow. It suffices to know for now that the control unit 565 also performs arbitration to resolve contention of incoming TI's for a common outgoing TI.

In this illustrative embodiment, each TI is connected to and communicates bidirectionally control signals with the control unit 565. For example, line 572 is used to communicate such control signals between TI 501a and the unit 565. One of the control signals transported by the line 572 is a request to the unit 565 for switching of data which is buffered in TI 501a. If such a request is granted, the buffered data of TI 501a will be transmitted via the multilead 531a to the switching circuity 523 where the data will be transferred to a selected outgoing TI.

Specifically, after receiving data frames from an incoming trunk, an incoming TI strips therefrom the start signals and end signals. The remaining data segments are stored in a buffer in the TI. Before sending data to the switching circuitry 523, the incoming TI reformats the data segments which are in serial data bits into 40-parallel-bit words. An outgoing TI performs an inverse function to an incoming TI. The outgoing TI when transmitting data onto an outgoing trunk converts the 40-bit words received from the switching circuitry 523 into serial bits and generates the requisite start signal and end signal to enclose each segment of the serial bits. The resulting data frames are then transmitted onto the outgoing trunk.

In implementing the 12 different routing trees in the network 10 pursuant to the RDMA scheme, time bands are assigned to each switching node so that the node can only switch data traffic therethrough during those time bands. Moreover, each time band assigned to such a switching node is associated with one of the 12 different routing trees.

Figure 6:
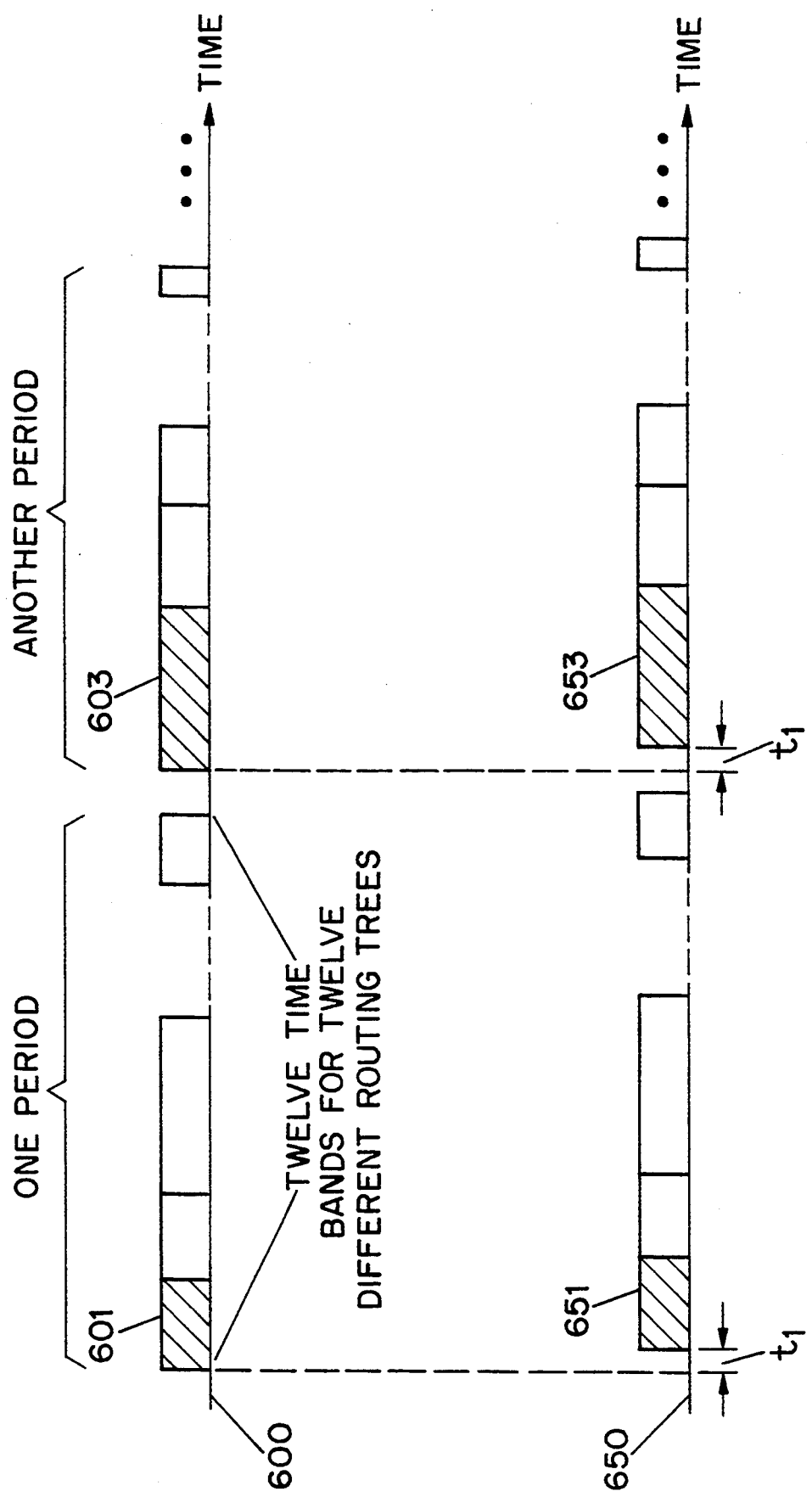
FIG. 6 is a timing diagram illustrating sequences of time bands for implementing various routing trees in the switched network of FIG. 1.

FIG. 6 illustrates a time line 600 associated with the switching node 105. Time bands 601 and 603 (shown in shaded boxes) are assigned to the node 105 to implement the routing tree of FIG. 4. During these time bands, the switching node 105 switches the incoming traffic from the lines 401, 406 and 407 onto the line 403 leading to the node 102, in accordance with the routing tree of FIG. 4. The unshaded boxes are time bands assigned to the switching node 105 to implement routing trees other than that of FIG. 4. In this particular embodiment, the sequence of time bands for the twelve different routing trees occur periodically, not necessarily in time but in a particular order of the routing trees, as the lengths of the individual time bands may vary from one period to another depending on the actual traffic demand.

FIG. 6 also illustrates another time line associated with the switching node 102, which is the receiving node with respect to the node 105 in accordance with the routing tree of FIG. 4. Similarly, bands 651 and 653 (shown in shaded boxes) are assigned to the node 102 to implement the routing tree of FIG. 4. The time band 651 corresponds to the time band 601 in that, during the respective time bands, the nodes 102 and 105 concertedly implement the routing tree of FIG. 4. Similarly, the time band 653 corresponds to the time band 603.

In order to ensure a smooth flow of traffic in the network 10, the corresponding time bands are assigned to the node 105 and the node 102 in such a way that the data frames from the node 105 when arriving at the node 102 are immediately switched thereby. Specifically, the time band 601 must lead the corresponding time band 651 by a time interval denoted t1 to account for a propagation delay, which is incurred during the travel of the data frames from the node 105 to the node 102. Similarly, the band 603 leads the corresponding band 653 by the same interval t1. Thus, in general, in implementing a particular routing tree, the time bands of the transmitting nodes and LA's with respect to a receiving node lead the corresponding time bands of the receiving node by time intervals reflecting the respective propagation delays.

Figure 7:
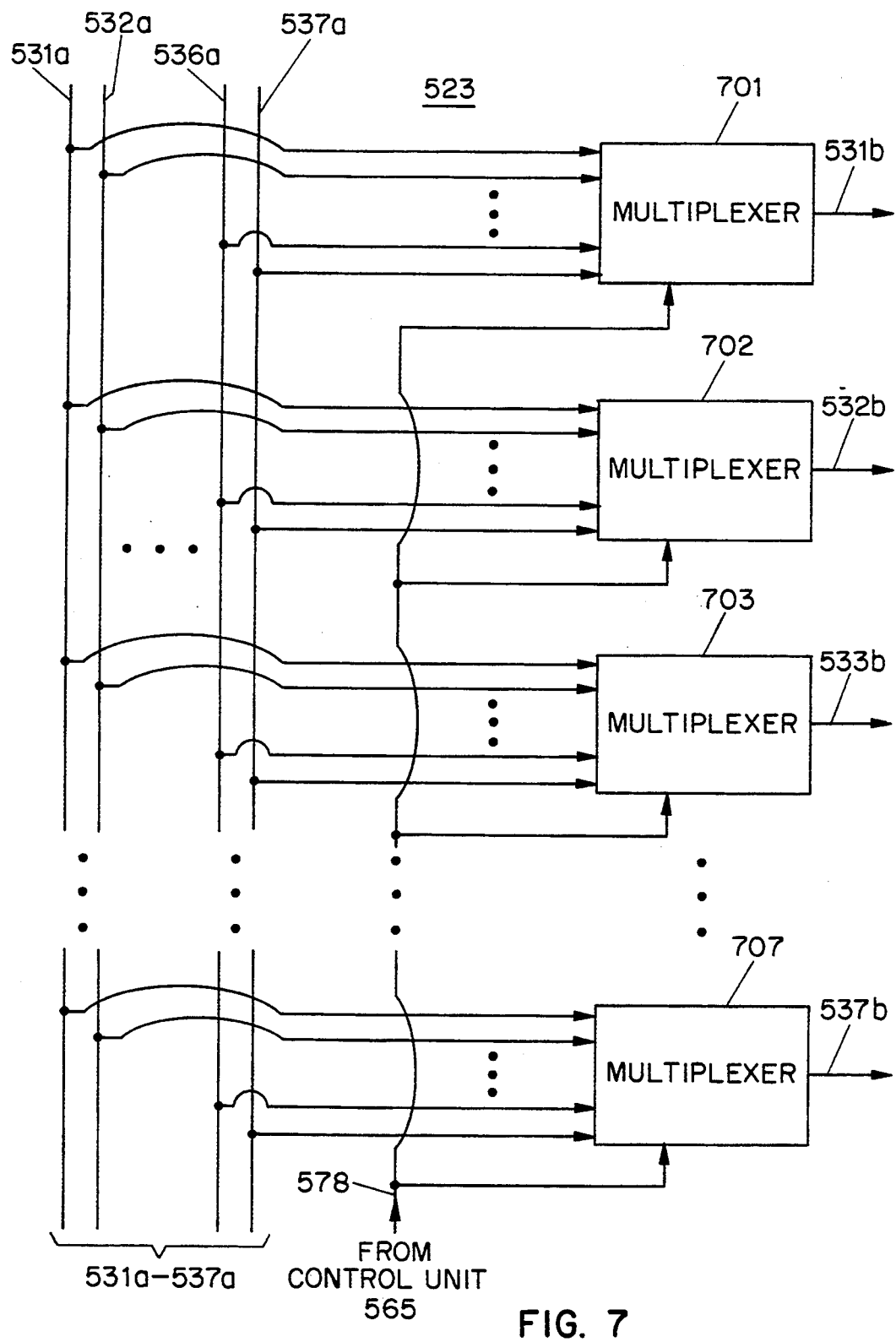
FIG. 7 is a block diagram of switching circuitry in the switching node of FIG. 5.

The switching circuitry 523 of the switching node 105 and its switching mechanism will now be described in detail. FIG. 7 illustrates the circuitry 523 comprising seven conventional multiplexers 701 through 707. As shown in FIG. 7, multileads 531a–537a are connected to the input of each multiplexer, and each of multileads 531b–537b is connected to the output of a different multiplexer. Through the control data multilead 578, the control unit 565 provides switch configuration information to each multiplexer for it to connect selected input multileads to its output.

Thus, for example, during the time band 601 of FIG. 6, during which the routing tree of FIG. 4 is implemented, the switching circuitry 523 is configured in such a way that only data words from multileads 531a (corresponding to incoming trunk 401a), 536a (corresponding to incoming trunk 406a) and 537a (corresponding to incoming trunk 407a) are switched onto multilead 533b (corresponding to the going trunk 403b). To this end, the control unit 565 instructs multiplexer 703 to connect only multileads 531a, 536a and 537a to its output which is the multilead 533b and, for every other multiplexer, to disconnect all the input multileads from its output.

In theory, if the synchronization is exact, the network 10 would operate according to the routing tree of FIG. 4. That is, no data frame should be on incoming trunks 402a, 403a, 404a and 405a leading to the node 105 during the time band 601. However, in practice, for any reason the synchronization could be slightly off. As a result, the incoming TI's 502a, 503a, 504a and 505a may receive data frames from the respective incoming trunks due to a holdover of a previous routing tree, or a premature application of an upcoming routing tree in a transmitting node with respect to the node 105. In any event, when any of the TI's 502a, 503a, 504a and 505a requests the control unit 565 to grant access to the switching circuitry 523, the unit 565 would deny its access after checking the current tree configuration of FIG. 4. The data received by any of these TI's will remain in their buffers. This data will however be routed through the node 105 when the appropriate routing trees occur. Thus, the missynchronization is at least partially remedied when, for example, the node 105 prematurely receives, at any of incoming TI's 502a, 503a, 504a and 505a, data frames for an upcoming routing tree from one or more transmitting nodes. Otherwise, the data frames received by the node 105 due to the missynchronization will be delivered to an incorrect destination. However, owing to the underlying protocols between the communications devices, the transmitting devices normally retransmit the misdelivered data frames upon receiving negative receipt acknowledgements from the intended receiving devices.

Refer now back to FIG. 5 in addition to FIG. 6. Depending on the traffic condition, the incoming TI's 501a, 506a and 507a may compete with one another to access the switching circuitry 523. The control unit 565 resolves such contention, and determines one of the contending TI's to be the winning TI which may exclusively access the circuitry 523. The algorithm whereby the control unit 565 resolves the contention is a so-called "round-robin" algorithm. The latter operates by arranging the contending TI's in a cycle, that is, indexing the contending TI's from 0 to n-1, where n is the number of the contending TI's. At each step, if the $i^{th}$ TI was selected and became a winning TI at the previous step, priority is given to the TI indexed $(i+1)$ mod n at the present step, where $0 \leq i \leq n-1$. This should ensure fairness in obtaining the access among the contending TI's. Specifically, the unit 565 sends a control signal to the winning TI to enable it to transmit data words from its buffer to the switching circuitry 523. The words, thus transmitted, are received by TI 503b through the multilead 533b, which is the only outgoing multilead currently connected to the circuitry 523. In this manner, the winning TI transfers data words to TI 503b until the buffer of the winning TI is depleted. Thereafter, the control unit 565 grants access to the circuitry 523 to one of the two remaining TI's having data to send. The second winning TI, again, transmits its data words to the outgoing TI 503b until the buffer is depleted. The last TI is then granted access to the circuitry 523 and, once again, transmits its data words until the buffer is depleted. In this manner, TI's 501a, 506a and 507a continue to access the switching circuitry 523 until the end of the current time band. At such time, any on-going transmission to the circuitry 523 is abruptly cut off, oftentimes resulting in partial transmission of data segments.

It is important to note at this point that the present design requires that a transmitting TI transmits only a copy of the data in its buffer, and it clears the original data from the buffer only after the transmission of its copy has been complete. As such, the last original data whose copy has not been fully transmitted before the end of the current time band is always retained in its entirety in the buffer. Notwithstanding such, in the present embodiment all the data which is retained in the buffers of the transmitting TI's however are cleared at the end of the current time band. Relying on the underlying protocols between the communications devices, the transmitting devices would retransmit the undelivered data upon receiving negative receipt acknowledgements from the intended receiving devices.

However, in an alternative embodiment where, unlike the present embodiment, the untransmitted data is saved in the buffers for later transmission, the above time bands are interleaved with special bands in an alternate manner. During a special band following the current time band, the data retained in the transmitting TI's at the end of the current time band is retrieved by the processor 511 within CMS 515. The processor 511 stores the retrieved data in the memory 513 until the special band preceding an upcoming time band for the routing tree of FIG. 4 occurs. During such a special band, the processor 511 downloads the data from the memory 513 to the respective transmitting TI's in anticipation of the recurrence of the routing tree of FIG. 4. As such, in this alternative embodiment retransmission by the transmitting devices resulting from a cut-off at the end of a time-band is desirably avoided.

It is apparent by now that the present Isochronet architecture is advantageous in that the processing speed of a switching node in the network 10 is only limited by the rate at which the incoming TI's manage to access the switching circuitry. The network configuration, band allocation, band synchronization and other control and management functions which normally consume significant processing time are performed by the control unit here, separate from the components which are involved in the actual flow of data traffic. As a result, the processing speed of an Isochronet network is much higher than the prior art networks.

Figure 8:
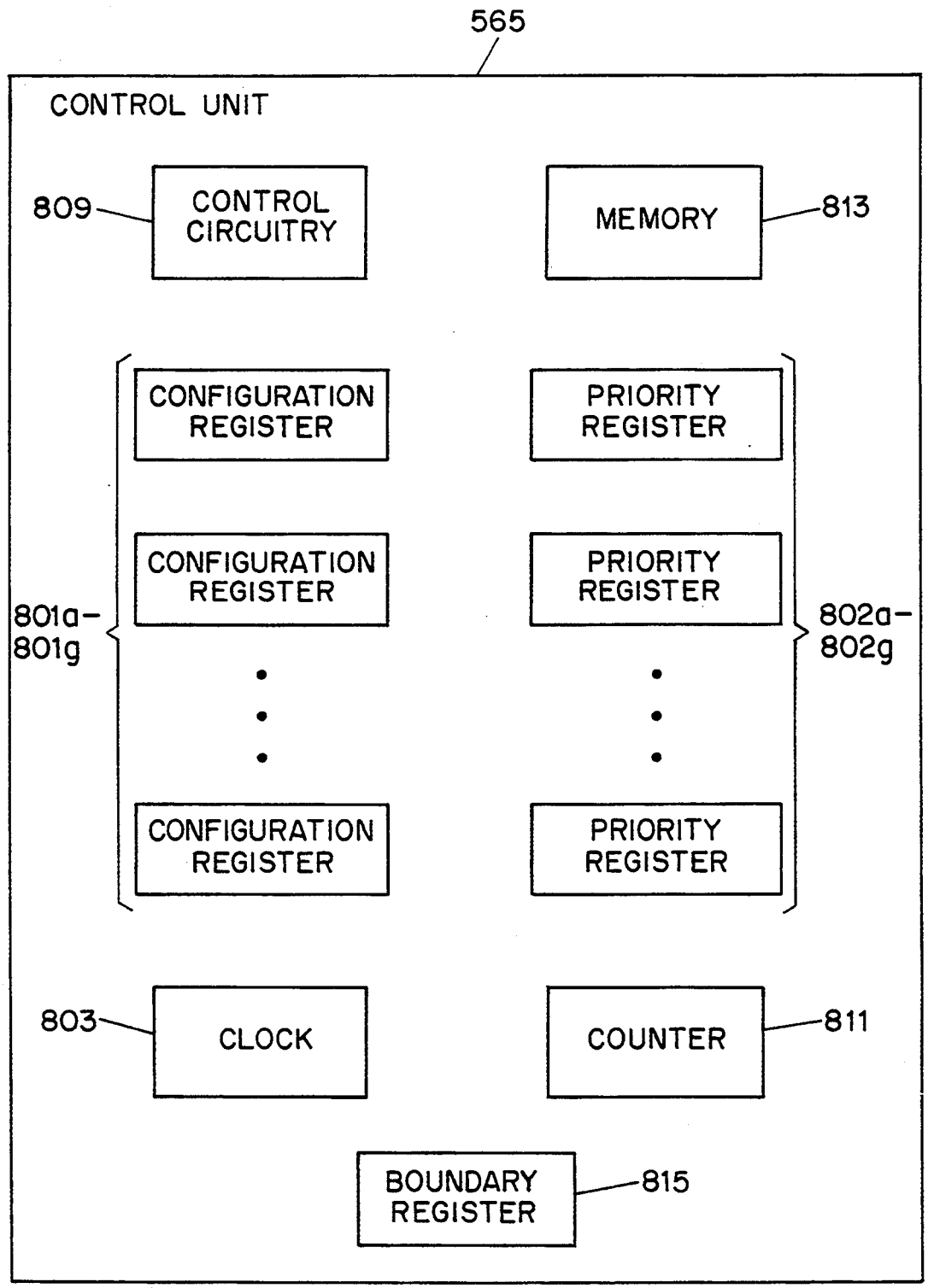
FIG. 8 is a block diagram of a control unit in the switching node of FIG. 5.

Referring to FIG. 8, the control unit 565 will now be further described. As mentioned before, the unit 565 is responsible for furnishing to the switching circuitry 523 data of the 12 different tree configurations involving the switching node 105. Such tree configuration information is stored in a memory 813. Also stored in the memory are the durations of the time bands allocated for the different tree configurations. In this particular embodiment, the trees are implemented periodically, and the durations of the bands are predetermined but varied according to the traffic history of the network 10, as illustrated in FIG. 6. Nevertheless, it will be appreciated that those skilled in the art may devise more sophisticated algorithms whereby the routing trees are implemented pursuant to real-time traffic demand, and the durations of the bands adapt to the changing traffic volume.

Specifically, the memory 813 is programmed by the processor 511 of CMS 515 to contain a look-up table having multiple columns. Each column is associated with a different routing tree involving the node 105. In this instance, since there are 12 such different routing trees, there are thus 12 such columns. The columns are arranged in an order identical to that of the occurrence of the routing trees associated therewith. Specifically, each column contains configuration information of the associated routing tree, duration of the time band therefor, and the priority information to be described. The table look-up is achieved using a pointer mechanism. The pointer indicates the memory address of the column containing the current tree configuration, time band duration and priory information. The current value of the pointer is stored in a pointer register 805 and is incremented at the end of each time band. Also contained in the unit 565 are control circuitry 809, a counter 811, a clock 803, a boundary register 815, seven configuration registers 801a–801g, and seven priority registers 802a–802g. The counter 811 is driven by the clock 803, which keeps the network time and is in synchronization with similar clocks in other nodes of the network 10. The network synchronization here is in accordance with a conventional scheme such as that used in an "Internet" architecture. For details on the Internet synchronization scheme, one can refer to: D. Mills, "Internet Time Synchronization: the Network Time Protocol," *IEEE Transactions on Communications*, vol. 39, no. 10, pp. 1482-93, October 1991.

The counter 811 is each time reset with a value representing the duration of the current time band. It then counts down to zero, signifying the end of the current time band. The boundary register 815 contains the maximum pointer value up to which the pointer increments. The maximum pointer value corresponds to the memory address of the last column of the aforementioned look-up table. The control circuitry 809 performs, among other things, the above-described round-robin algorithm to resolve the contention of access to the switching circuitry 809.

Figure 9:
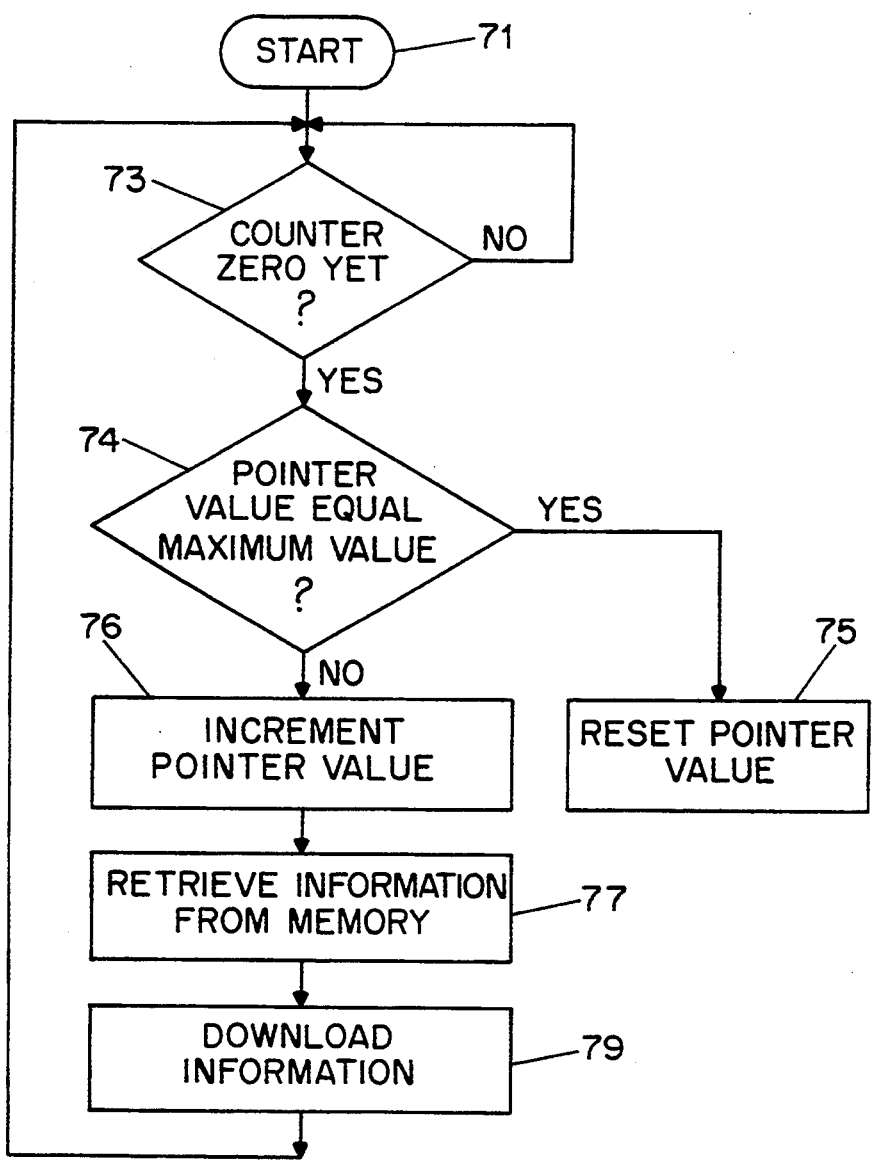
FIG. 9 is a flow chart depicting a sequence of steps performed by the control unit of FIG. 8.

FIG. 9 is a flow chart depicting a sequence of steps which are also performed by the control circuitry 809 to accomplish the switching function of the node 105. The control circuitry 809 starts at step 71, and determines at step 73 whether the counter 811 has counted down to zero. If the counter has not yet reached zero, it repeats step 73 but, otherwise, proceeds to step 74. At step 74, the circuitry 809 compares the current pointer value stored in the pointer register 805 with the maximum pointer value stored in the boundary register 815. If the two values are equal, i.e., a cycle or period involving the twelve different routing trees has been completed, the pointer value will be reset to indicate the memory address of the first column of the look-up table to start a new cycle, as indicated at step 75. Otherwise, it will increment the pointer value to equal the memory address of the next column, as indicated at step 76. From either of step 75 or step 76, the circuitry 809 proceeds to step 77 where the circuitry causes the tree configuration, band duration and priority information to be retrieved from the column of the look-up table at which the pointer is pointing, and such information is associated with the upcoming, new band. The circuitry 809 then causes. the tree configuration information to be downloaded on the configuration registers 801a–801g, and the priority information to be downloaded to the priority registers 802a–802g, and the counter 811 to be reset with the new band duration to start the new band, as indicated at step 79. Simultaneously, the multiplexers 701–707 within the switching circuitry 523 are respectively configured in accordance with the contents of the registers 801a–801g in a manner to be described. The control circuitry 809 returns to step 73 previously described.

Figures 10A, 10B:
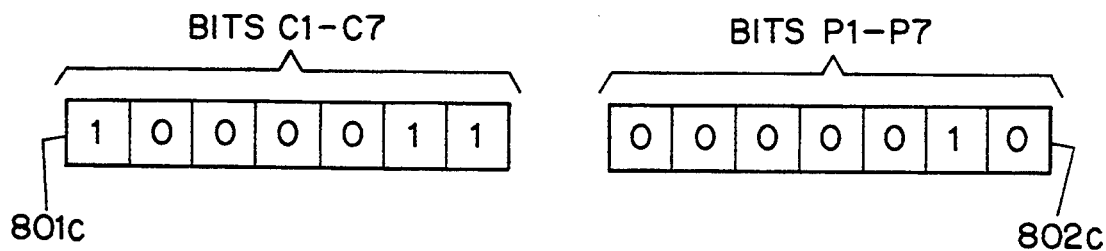
FIG. 10A illustrates the bit map of a configuration register in the control unit of FIG. 8.
FIG. 10B illustrates the bit map of a priority register in the control unit of FIG. 8.

FIG. 10A illustrates the bit map of a configuration register such as the configuration register 801c. In this illustrative embodiment, the configuration registers 801a–801g are associated with the multiplexers 701–707, respectively. In particular, the configuration register 801c is associated with the multiplexer 703. As shown in FIG. 10A, the configuration register contains bits c1-c7 corresponding to the seven multileads 531a–537a, respectively. By way of example, but not limitation, a bit within a particular configuration register having a binary value 1 indicates that the multilead corresponding to the bit should be connected to the output of the multiplexer associated with that particular register, and a bit value 0 indicates that the corresponding multilead should be disconnected therefrom. Continuing the previous example where only the multileads 531, 536 and 537 are connected by the multiplexer 703 to its output multilead 533b in accordance with the routing tree of FIG. 4, the bit pattern of the associated configuration register 801c is thus 1000011, with only the first, sixth and seventh bits having a binary value 1. In addition, every other configuration register in that example contains all zero bit values, causing their associated multiplexers 701, 702 and 704–707 to disconnect the input multileads 531a–537a from the respective outputs.

FIG. 10B illustrates a priority register within the control unit 565 such as the register 802c. In this illustrative embodiment, the priority registers 802a–802g are associated with the multiplexers 701–707, respectively. In particular, the priority register 802c is associated with the multiplexer 703. As shown in FIG. 10B, the priority register contains bits p1–p7. These bits respectively correspond to the TI's 501a–507a connected to the associated mulitplexer through the respective multileads 531a–537a. By way of example, but not limitation, a bit having a binary value 1 indicates that the TI has priority to access the associated multiplexer, regardless of the underlying contention resolution algorithm. Thus, continuing the previous example where TI's 501a, 506a and 507a may compete for the multiplexer 703, if only the bit p6 in the priority register 802c is set to 1 as shown in FIG. 10, TI 506a will have priority over the other TI's 501a and 507a to access the multiplexer 703.

In this particular illustrative embodiment, the preemptive access by the priority TI is limited in time. To this end, a subband is assigned within a time band during which the priority TI can exercise the preemptive access only. During the subband, if the priority TI has data words to send, its request to access a selected multiplexer within the switching circuitry 523 will be immediately granted by the control unit 565, regardless of whether there are data words from a second TI currently traveling through the circuitry 523. In the event that there are such data words, the latter will be lost, and the control unit 565 will inform the second TI of the preemptive access by the priority TI. Since the second TI, as every TI in the disclosed embodiment, keeps the original of the transmitted data in its buffer until its copy is completely transmitted, it would attempt to retransmit another copy of the data as soon as the subband is over.

For the sake of completeness, it should be pointed out that the bridge machine 203 of FIG. 2 also performs an address-checking function. That is, after collecting data packets from a communications device, the bridge machine 203 is required to check the destination addresses of such packets before they are conveyed to the network 10. To this end, each bridge machine in the network 10 includes a look-up table containing the schedules for different routing trees and their respective duration information. With such a look-up table, the bridge machine 203 releases, to the network 10, data frames intended for a particular destination node only when the routing tree associated with that node is being implemented.

Figure 11:
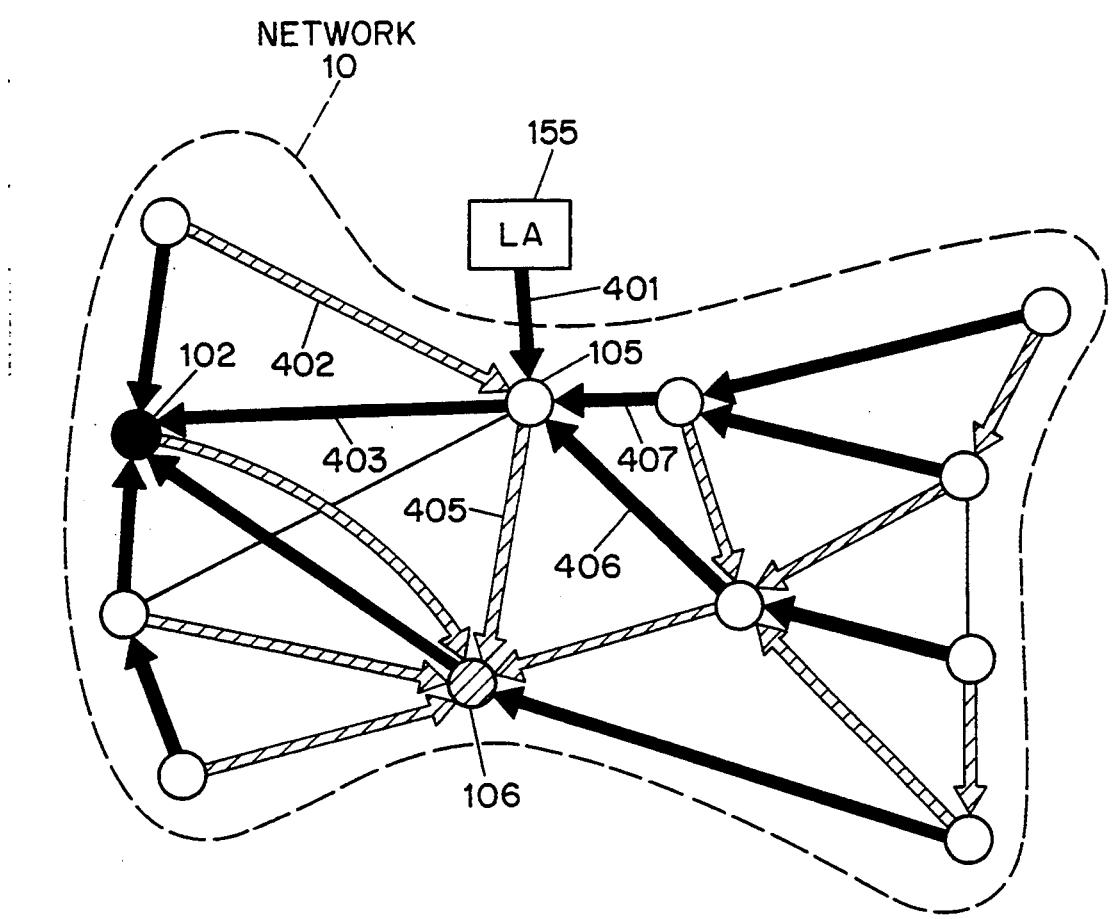
FIG. 11 illustrates two nonoverlapping routing trees simultaneously implemented in the switched network of FIG. 1.

It is important to note at this juncture that the throughput of the network 10 can be increased significantly by using nonoverlapping routing trees during the same time band. FIG. 11 shows two nonoverlapping trees which share no common line. A closer look at FIG. 11 reveals that the routing tree defined by the solid arrows is the same as the routing tree of FIG. 4. The additional routing tree is defined by the shaded arrows and is associated with the destination node 106 which is also shaded. In order to implement the nonoverlapping trees, each node in the network 10 needs to be somewhat modified.

For example, for simultaneously handling the two routing trees of FIG. 11, the switch 560 of the node 105 needs to be modified so that it operates at a rate twice as fast as before. In addition, the control unit 565 is required to assign time slots within a time band for servicing the two nonoverlapping trees in an alternate manner. That is, during a time slot, only the incoming TI's specified by one of the nonoverlapping routing trees are allowed to compete for access to the switching circuitry 523, and during the following time slot, only the incoming TI's specified by the other routing tree are allowed to compete, and so on and so forth. (In this special instance notwithstanding, during the time slots assigned to the routing tree associated with the destination node 106, only the incoming trunk interface associated with line 402 would request to access the switching circuitry.) Of course, the switching circuitry 523 needs to be configured according to one or the other of the routing trees during the alternate time slots to properly transfer data frames converging on the node 105. This being so, the control unit 565 is required to have an additional set of configuration registers similar to the registers 801a–801g for providing information to configure the switching circuitry 523 according to the additional tree configuration. Moreover, in order to realize the preemptive access feature, the unit 565 is required to have an additional set of priority registers similar to the registers 802a–802g for specifying any priority TI's during a subband, which is made part of a time slot.

Based on the disclosure heretofore, it should be apparent to those skilled in the art that the implementation of three or more nonoverlapping trees in the network 10 would simply call for multiplication of the relevant hardware, clock rate, etc. The detailed description of such implementation is thus omitted here.

The foregoing merely illustrates the principles of the invention. It will thus be appreciated that those skilled in the art will be able to devise numerous arrangements which, although not explicitly shown or described herein, embody the principles of the invention and are thus within its spirit and scope.

For example, although the bridge machine 203 of FIG. 2 in the disclosed embodiment connects a local area network to the switched network 10, this does not in any way exclude the possibilities of connecting other types of communications devices to the network through the bridge machine, as previously noted in the disclosure. In fact, through the bridge machine capable of performing the abovedescribed functions, one may also connect to the network 10 another switched or private network implementing a totally different communications scheme from the network 10.

Moreover, the time bands of FIG. 6 may be interleaved with multicast bands during which the network 10 operates in a multicast mode. In this mode, data is routed according to routing trees which allow the data to be multicast from a single LA to multiple other LA's. Thus, the routing trees used for the multicast mode are each associated with a source node, rather than a destination node as before. As such, an easy way to derive the multicast routing trees is to reverse the directions of the data flows in the routing trees previously described. For example, a multicast routing tree derived this way from the routing tree of FIG. 4 allows data from the node 102 to be multicast to all other nodes in the network 10.

In addition, the term "data" used in the present disclosure broadly encompasses computer data, voice data, video data, etc.

Finally, the exemplary embodiment of the invention is disclosed herein in a form in which the various communications functions are performed by discrete functional blocks. These functional blocks may be implemented in various ways and combinations using logic circuitry and/or appropriately programmed processors, as will be known to those skilled in the art.

We claim:

1. A communications network comprising:
a plurality of switching nodes interconnected with one another with communications links, each switching node connected to one or more incoming links from which the switching node receives data and to one or more outgoing links to which the switching node transfers the data comprising:
means for providing configuration information on routing trees involving the switching node, each of said routing trees specifying routing of the data through the switching node;
means for defining a sequence of time bands, each time band being associated with one or more of said routing trees;
means for receiving configuration information on the one or more of said routing trees for particular time bands associated therewith; and
means responsive to the configuration information received by the receiving means for switching the data from a subset of said incoming links to a subset of said outgoing links during said particular time bands.

2. The network of claim 1 wherein each routing tree is associated with a different switching node and specifies routing of the data in the network to said different node through which the data exits the network.

3. The network of claim 1 wherein the one or more of said routing trees include a plurality of nonoverlapping routing trees, each of which involves different ones of said subset of said incoming links and a different one of said subset of said outgoing links.

4. The network of claim 3 wherein the number of links in said subset of said outgoing links equals the number of said nonoverlapping routing trees.

5. The network of claim 3 wherein the switching node further comprises means for defining a plurality of time slots within a time band, each time slot being associated with a nonoverlapping routing tree, the switching node switching the data according to a particular nonoverlapping routing tree during time slots associated therewith.

6. The network of claim 1 wherein the switching means includes multiplexer means for transferring the data from said subset of incoming links to said subset of outgoing links; and control means for configuring said multiplexer means in response to said configuration information.

7. The network of claim 6 wherein the switching node further comprises a plurality of outgoing interfaces, each outgoing interface being connected to selected multiplexer means at one end and a different outgoing link at the other end to transfer the data from said selected multiplexer means to said different outgoing link.

8. The network of claim 6 wherein the switching node further comprises a plurality of incoming interfaces, each incoming interface being connected to each multiplexer means at one end and to a different incoming link at the other end to transfer the data from said different incoming link to the multiplexer means.

9. The network of claim 8 wherein each incoming interface further includes means for generating a request to transfer the data to said switching means, said control means including means for granting said request based on a contention algorithm.

10. The network of claim 9 wherein said contention algorithm is of the type of a round-robin algorithm.

11. The network of claim 8 wherein the switching node includes means for selecting one or more of said incoming interfaces to be priority interfaces, said priority interfaces having priority over other incoming interfaces to transfer data therefrom to said switching means.

12. The network of claim 11 wherein said particular time bands each include a subband during which said priority interfaces transfer data therefrom to said switching means exclusively.

13. The network of claim 1 wherein at least two of the time bands are different in length.

14. A communications network comprising:
a plurality of switching nodes, each switching node connected to one or more incoming links and to one or more outgoing links comprising:
means for defining a sequence of time bands, each time band is associated with one or more routing trees each specifying a subset of said incoming links from which the switching node receives data and a subset of said outgoing links to which the data is transferred;
means for switching the data;
means for configuring said switching means to switch the data from said subset of said incoming links to said subset of said outgoing links during the time band;
a plurality of incoming interfaces for transferring the data from said incoming links to said switching means, each incoming interface being connected to a different incoming link; and
a plurality of outgoing interfaces for transferring data from said switching means to said outgoing links, each outgoing interface being connected to a different outgoing link.

15. The network of claim 14 wherein each routing tree is associated with a different node and specifies routing of the data in the network to said different node through which the data exits the network.

16. The network of claim 14 wherein the one or more of said routing trees include a plurality of nonoverlapping routing trees, each of which involves different ones of said subset of said incoming links and a different one of said subset of said outgoing links.

17. The network of claim 16 wherein the number of links in said subset of said outgoing links equals the number of said nonoverlapping routing trees.

18. The network of claim 16 wherein the switching node further comprises means for defining a plurality of time slots within said time band, each time slot being associated with a nonoverlapping routing tree, the switching means switching the data according to a particular nonoverlapping routing tree during time slots associated therewith.

19. The network of claim 14 wherein each incoming interface includes a buffer for storing data from the incoming link connected thereto.

20. The network of claim 14 wherein the switching means includes multiplexer means for transferring the data from said subset of incoming links to said subset of outgoing links.

21. The network of claim 20 wherein each outgoing interface being connected to selected multiplexer means within said switching means to transfer the data from said selected multiplexer means to said different outgoing link.

22. The network of claim 20 wherein each incoming interface being connected to each multiplexer means within said switching means to transfer the data from said different incoming link to the multiplexer means.

23. The network of claim 14 wherein each incoming interface further includes means for generating a request to transfer the data to said switching means, said configuring means including means for granting said request based on a contention algorithm.

24. The network of claim 23 wherein said contention algorithm is of the type of a round-robin algorithm.

25. The network of claim 14 wherein the switching node includes means for selecting one or more of said incoming interfaces to be priority interfaces, said priority interfaces having priority over other incoming interfaces to transfer data therefrom to said switching means.

26. The network of claim 25 wherein said time band includes a subband during which said priority interfaces transfer data therefrom to said switching means exclusively.

27. The network of claim 14 wherein at least two of the time bands are different in length.

28. The network of claim 14 wherein each incoming interface includes a buffer for storing data from the incoming link connected thereto.

29. A method for use in a communications network comprising a plurality of switching nodes interconnected with one another with communications links, each switching node connected to one or more incoming links from which the switching node receives data and to one or more outgoing links to which the switching node transfers the data, said method comprising the steps of:
providing in each switching node configuration information on routing trees involving the switching node, each of said routing trees specifying routing of the data through the switching node;
defining a sequence of time bands, each time band being associated with one or more of said routing trees;
receiving in the switching node configuration information on the one or more of said routing trees during particular time bands associated therewith; and
switching by switching means the data from a subset of said incoming links to a subset of said outgoing links in response to the configuration information received by the receiving step during said particular time bands.

30. The method of claim 29 wherein each routing tree is associated with a different switching node and specifies routing of the data in the network to said different node through which the data exits the network.

31. The method of claim 30 wherein the one or more of said routing trees include a plurality of nonoverlapping routing trees, each of which involves different ones of said subset of said incoming links and a different one of said subset of said outgoing links.

32. The method of claim 31 wherein the number of links in said subset of said outgoing links equals the number of said nonoverlapping routing trees.

33. The method of claim 31 wherein the defining step including the step of dividing each time band into a plurality of time slots, each time slot being associated with a nonoverlapping routing tree, the switching node switching the data according to a particular nonoverlapping routing tree during time slots associated therewith.

34. The method of claim 29 wherein the switching means includes multiplexer means for transferring the data from said subset of incoming links to said subset of outgoing links; said method further comprising the step of configuring said multiplexer means in response to said configuration information.

35. The method of claim 34 wherein the switching node further comprises a plurality of incoming interfaces, each incoming interface being connected to each multiplexer means at one end and to a different incoming link at the other end to transfer data from said different incoming link to the multiplexer means, said method further comprising the step of generating by a subset of said incoming interfaces requests to transfer the data to said switching means, and said configuring step including the step of granting said requests based on a contention algorithm.

36. The method of claim 35 wherein said contention algorithm is of the type of a round-robin algorithm.

37. The method of claim 35 wherein said particular time bands each include a subband during which said priority interfaces transfer data therefrom to said switching means exclusively.

38. The method of claim 34 further comprising the step of selecting one or more of said incoming interfaces to be priority interfaces, said priority interfaces having priority over other incoming interfaces to transfer data therefrom to said switching means.

39. The method of claim 29 wherein at least two of the time bands are different in length.

40. A method for use in a communications network comprising a plurality of switching nodes, each switching node connected to one or more incoming links and to one or more outgoing links comprising switching means, said method comprising the steps of:
defining a sequence of time bands, each time band is associated with one or more routing trees each specifying a subset of said incoming links from which the switching node receives data and a subset of said outgoing links to which the data is transferred, each routing tree being associated with a different switching node;
configuring said switching means to switch the data from said subset of said incoming links to said subset of said outgoing links during the time band;
transferring, by a plurality of incoming interfaces in the switching node, the data from said incoming links to said switching means, each incoming interface being connected to a different incoming link; and
transferring, by a plurality of outgoing interfaces in the switching node, the data from said switching means to said outgoing links, each outgoing interface being connected to a different outgoing link.

41. The method of claim 40 wherein each routing tree is associated with a different node and specifies routing of the data in the network to said different node through which the data exits the network.

42. The method of claim 40 wherein said one or more routing trees include a plurality of nonoverlapping routing trees, each of which involves different ones of said subset of said incoming links and a different one of said subset of said outgoing links.

43. The method of claim 42 wherein the number of links in said subset of said outgoing links equals the number of said nonoverlapping routing trees.

44. The method of claim 40 wherein the defining step includes the step of dividing a time band into a plurality of time slots, each time slot being associated with a nonoverlapping routing tree, the data being switched by the switching means according to a particular nonoverlapping routing tree during time slots associated therewith.

45. The method of claim 40 further comprising the step of generating, by the incoming interfaces, requests to transfer the data to said switching means, the configuring step including the step of granting said requests based on a contention algorithm.

46. The method of claim 45 wherein said contention algorithm is of the type of a round-robin algorithm.

47. The method of claim 40 further comprising the step of selecting, at the switching node, one or more of said incoming interfaces to be priority interfaces, said priority interfaces having priority over other incoming interfaces to transfer data therefrom to said switching means.

48. The method of claim 47 wherein said time band includes a subband during which said priority interfaces transfer data therefrom to said switching means exclusively.

49. The method of claim 40 wherein at least two of the time bands are different in length.

* * * * *

UNITED STATES PATENT AND TRADEMARK OFFICE
CERTIFICATE OF CORRECTION

PATENT NO. : 5,418,779
DATED : May 23, 1995
INVENTOR(S) : Yemini et al.

It is certified that error appears in the above-indentified patent and that said Letters Patent is hereby corrected as shown below:

On the title page, item [75]:

"Briarclife" should read --Briarcliff--:

Title page 5th line of Item 56, "Ba atz" should read --Baratz--;
"Attorney" line, "Brumbaugh & Graves" should read -- Brumbaugh, Graves--.

Col. 1, line 34, "ofTeach" should read --of each-- Col. 1, line 64, "networks" should read --network--;
Col. 15, line 9, "being" should read --is--; Col. 15, line 14, "being" should read --is--;
Col. 16, line 7, "including" should read --includes--.

Signed and Sealed this

Twenty-seventh Day of February, 1996

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,418,779
DATED : May 23, 1995
INVENTOR(S) : Yechiam Yemini et al.

It is certified that error appears in the above-indentified patent and that said Letters Patent is hereby corrected as shown below:

Col. 1, before line 5, insert -- The United States Government has certain rights in this invention pursuant to award CDR-881111 by the Natinal Science Foundation. --

Signed and Sealed this

Twentieth Day of May, 1997

Attest:

BRUCE LEHMAN

Attesting Officer

Commissioner of Patents and Trademarks